T. B. FARRELL & M. D. BORST.
THILL-COUPLING.

No. 188,613. Patented March 20, 1877.

WITNESSES:
Gustave Dieterich
Alex T. Roberts.

INVENTORS.
T. B. Farrell
M. D. Borst,
BY
Munn
ATTORNEYS.

UNITED STATES PATENT OFFICE.

THOMAS B. FARRELL AND MARTIN D. BORST, OF COBLESKILL, N. Y.

IMPROVEMENT IN THILL-COUPLINGS.

Specification forming part of Letters Patent No. 188,613, dated March 20, 1877; application filed January 19, 1877.

*To all whom it may concern:*

Figure 1:
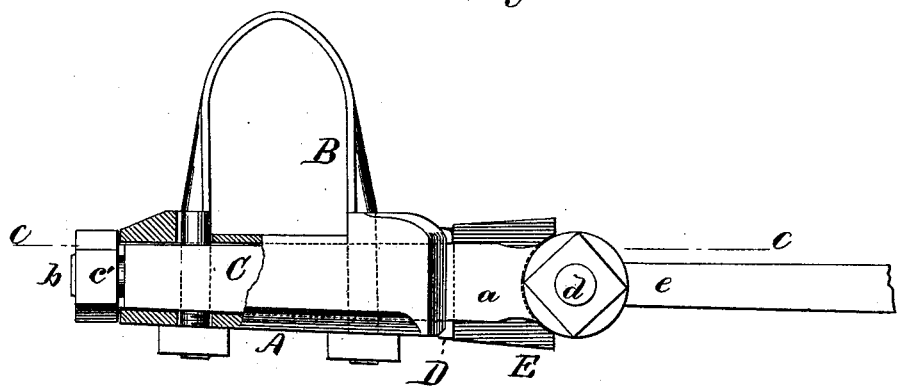
Figure 2:
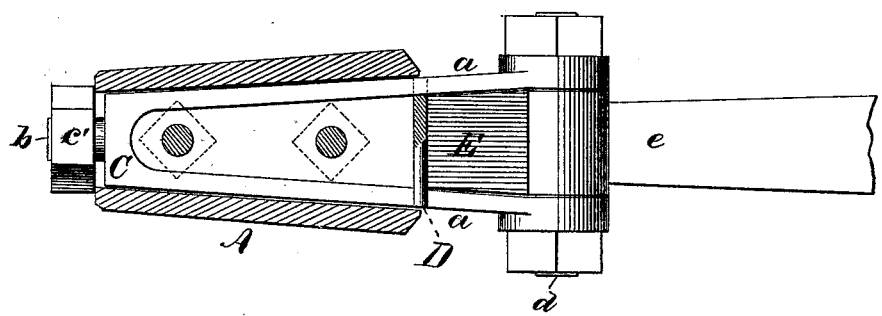

Be it known that we, THOMAS B. FARRELL and MARTIN D. BORST, of Cobleskill, in the county of Schoharie and State of New York, have invented a new and Improved Thill-Coupling, of which the following is a specification:

Figure 1 is a side elevation of our improved thill-coupling, with parts broken away to show the internal construction. Fig. 2 is a top view in section on line $c\,c$, Fig. 1.

Similar letters of reference indicate corresponding parts.

Our invention consists of a fork or yoke for receiving the thill-irons, that fits into a socket attached to axle by means of a clip. The said fork is provided with a rubber spring, that presses against the thill-iron, and abuts upon a plate that rests against the socket. A nut is provided at the rear end of the fork, for drawing it into the socket and tightening the rubber spring.

Referring to the drawing, A is a socket attached to the axle of the carriage by the clip B. The hole through this socket is tapering, and to it the fork C is fitted. The arms $a\,a$ of the fork diverge to receive the thill-iron $e$, and are thickened and bored to receive the bolt $d$, that retains the thill-iron. A threaded shank, $b$, projects from the rear end of the fork C, and is provided with a nut, $c'$, which presses upon the rear end of the socket A. D is a plate placed between the arms of the fork C, and resting against the front of the socket A. E is a rubber spring placed between the thill-iron $e$ and the plate D. The shanks of the clip B pass through the socket A, and also between the arms $a$ of the fork C, so that should the nut $c'$ become loosened the closed end of the fork will be engaged by the said shanks, and the fork will be prevented from leaving the socket.

When the rubber spring becomes loose from wear or otherwise it is tightened by turning the nut $c'$, and all noise and rattling are obviated.

Having thus described our invention, we claim as new and desire to secure by Letters Patent—

The combination of the fork C, having diverging side arms $a\,a$, shank $b$, and nut $c'$, and the piece A, provided with a tapering socket, with the clip B; plate D, rubber cushion E, and thill-head, substantially as herein shown and described.

THOMAS B. FARRELL
MARTIN D. BORST.

Witnesses:
AARON H. ESMAY,
D. J. SLOW.